July 24, 1956 P. D. JOHNSON 2,756,343
RADIATION MEASURING DEVICE
Filed Oct. 2, 1952
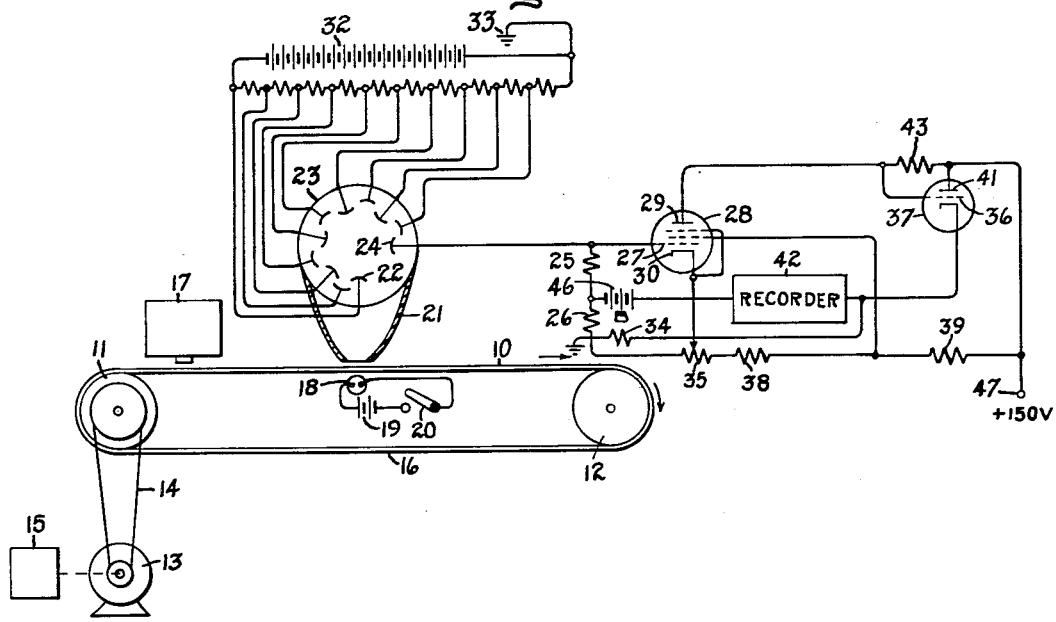
Fig. 1.
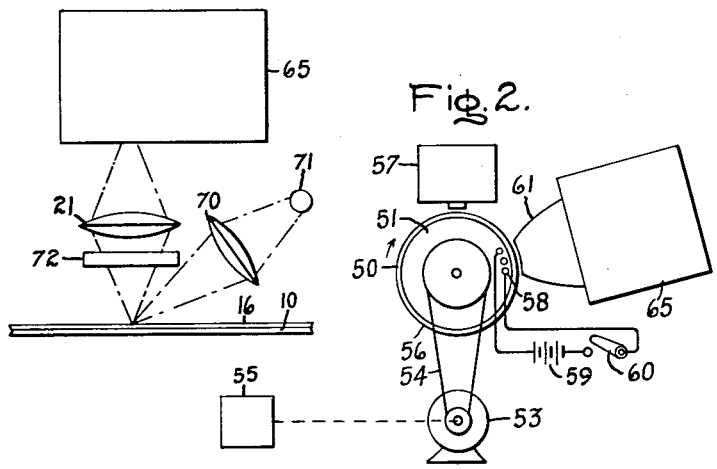
Fig. 3.
Fig. 2.
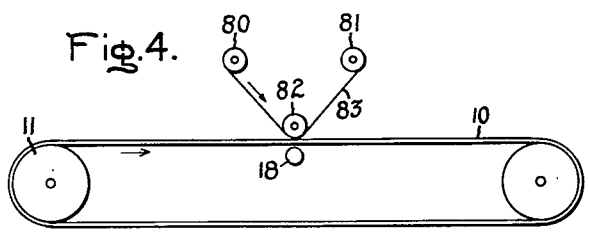
Fig. 4.
Inventor:
Peter D. Johnson,
by Paul A. Frank
His Attorney.

United States Patent Office 2,756,343
Patented July 24, 1956

2,756,343

RADIATION MEASURING DEVICE

Peter D. Johnson, Schenectady, N. Y., assignor to General Electric Company, a corporation of New York Application October 2, 1952, Serial No. 312,731

6 Claims. (Cl. 250—71)

This invention relates to a radiation measuring device which may be utilized to measure the radiation given off by a very feeble source.

When monochromators, spectrophotometers and similar devices are used in the ultraviolet and X-ray regions of the spectrum, the resulting radiation is frequently too feeble to be measured by any of the techniques readily available and readily applied.

Accordingly, it is an object of this invention to provide a radiation measuring device capable of measuring radiation from a very feeble source.

It is another object of the invention to provide a radiation measuring device capable of storing the effect of feeble radiation and subsequently emitting secondary radiation of a magnitude susceptible to measurement.

It is a further object of the invention to provide a radiation measuring device utilizing a phosphor capable of absorbing radiation from a feeble source over a period of time and releasing the accumulated energy as secondary radiation over a short period of time.

Briefly stated, in accordance with one embodiment of this invention, a radiation measuring device comprises a surface coated with a phosphor having electron traps in which untrapping occurs by heating to temperatures above room temperature or by infrared irradiation, means for positioning this phosphor surface to intercept rays emanating from a source of radiation, means for causing the phosphor surface to emit after having been subjected to radiation, and means for measuring the resulting emission.

The drawing illustrates two embodiments of my invention, both of which are shown in schematic form.

In Fig. 1, the invention is illustrated utilizing a phosphor surface on an endless belt;

In Fig. 2, a rotatable drum having a phosphor surface is substituted for the endless belt of Fig. 1;

Fig. 3 shows an alternative embodiment in which emission of light from the phosphor is stimulated by infrared radiation; and Fig. 4 shows an additional embodiment of my invention wherein a photographic emulsion in contact with the phosphor strip serves as the detector.

Referring to Fig. 1, an endless belt 10 is mounted upon a pair of pulleys 11 and 12. The pulley 11 is rotated by a belt 14 driven by an electric motor 13, the speed of which may be manually controlled by setting a control box 15.

The belt 10 is coated with a phosphor 16 of a type having electron traps which can be filled at room temperature in which untrapping, resulting in emission, occurs at temperatures above room temperature. A great many phosphors possess this property of excitation by electrons to a metastable state in which the electrons are subsequently released to the emitting state by heating or by infrared irradiation. Among these phosphors are zinc fluoride activated by manganese, calcium sulfate activated by manganese, zinc sulfide, calcium sulfide activated by samarium and europium, and potassium chloride activated by thallium. These phosphors are all well known in the art and are prepared by heating the proper proportions of raw ingredients to firing temperature. The phosphors have the property of absorbing radiation at temperatures of the order of 25° C. and emitting upon the subsequent application of heat or irradiation with infrared.

The belt 10 having the phosphor layer 16 is arranged to pass in proximity to a radiation source 17. As previously mentioned, the source 17 may be a monochromator or a spectrophotometer but it is obvious that other types of radiation source may be used.

At another location traversed by the belt 10, a heating element 18 is positioned in proximity to the belt. The element 18 may be an electric resistance element energized by a current source such as the battery 19 under the control of a manual switch 20. However, other sources of heat are equally satisfactory. Positioned on the other side of the belt 10 from the heating element 18 is a focussing element 21, which may be a lens or a reflector, directed toward the cathode 22 of a photomultiplier tube 23 which is part of a circuit utilized to measure the intensity of emission given off by the phosphor 16 under the influence of heat applied by the heating element 18. The circuit including the photomultiplier tube 23 is a means for recording the effect of emission from the phosphor 16. In many applications less sensitive circuits, such as ordinary photoelectric cell circuits, will be equally satisfactory for the purposes of this invention.

The element 21, which is preferably elliptic in configuration, may be formed of a material such as aluminum, or it may be a silvered glass. The cathode 22 is preferably at one focal point of the reflector 21 and the heated surface of the phosphor at the other focal point. During operation, light quanta emitted by the phosphor 16 impinge upon the cathode 22 and produce a series of discharges between the various electrodes of the photomultiplier 23 during passage between the electrodes to the anode 24.

The signal from the anode 24 is impressed upon the control electrode 27 of a pentode 28. The signal from the pentode 28 is impressed upon the control electrode 36 of a vacuum tube triode 37. When the triode 37 becomes conducting, a recorder 42 is advanced. The recorder 42 may be an instrument of the type disclosed in Nickle Patent 1,920,764.

During operation, when there is no current flowing through resistor 25, the resistor 35, which controls the control electrode bias of the tube 28, is adjusted so that the current through the recorder 42 is zero. The current from the electrode 24 of the photomultiplier passes through the resistor 25 which unbalances the circuit and causes a current to flow through the recorder 42 larger than the current through the resistor 25 by the ratio of the resistors 25 and 26. The resistors 34, 35, 38, 39, and 43 and the battery 46, maintain the voltages supplied to the tube electrodes at the proper values. No resistance values of the resistors have been given since these may vary considerably as long as their relationships are properly correlated. Proper correlation is well within the realm of one skilled in the art.

In the embodiment illustrated in Fig. 2, the endless belt 10 is replaced by a drum 50 which has a coating of phosphor 56 thereon. The operation of Fig. 2 is otherwise the same as Fig. 1 and like parts have been numbered 40 above the corresponding parts of Fig. 1. Since the photomultiplier circuit may be the same in both Figs. 1 and 2, it has been shown in block form at 65 in Fig. 2.

In the embodiment illustrated in Fig. 3, infrared stimulation of the charged phosphor layer 16 is substituted for the heating element 18. A source 71 of infrared radiation is focussed by a lens 70 onto the phosphor 16 causing it to emit as a result of the optical stimulation. The resulting emission passes through a filter 72 which blocks the passage of any infrared light which might have been reflected from the phosphor 16 but allows the phosphor emission to pass. The emission is then focussed by a focussing element 21, here shown as a lens, onto the photomultiplier circuit shown in block form at 65.

In the embodiment illustrated in Fig. 4, a photographic emulsion strip 83 in contact with the phosphor strip 16 serves as the detector in place of the photomultiplier and recorder illustrated in Fig. 1. A take-up reel 81 draws the film strip 83 under a tension maintaining reel 82 from a supply reel 80.

Alternatively, the film strip 83 may be placed in contact with the entire exposed area of the phosphor 16. The entire phosphor may then be heated, resulting in emission from all parts simultaneously thereby exposing the film strip more quickly.

In explaining the operation of the device with reference to Fig. 1, let it be assumed that the source of radiation 17 is very feeble. In order to exclude the effects of exterior sources of light, the apparatus must be operated in a dark room or, if this is not easily arranged, the portions of the apparatus associated with the phosphor layer 16 must be shielded from light. The motor 13 is energized sufficiently to enable the phosphor layer 16 to move slowly past the radiation source 17. If desired, several passes of the phosphor may be made. At this point, the radiation source 17 is blocked off and the motor 13 is rotated more rapidly while the switch 20 is closed to energize the heating element 18. The phophor 16 emits and the intensity of emission is recorded by means of the photomultiplier circuit and recorder 42. When the emission is complete, the phosphor 16 is ready to be subjected to additional radiation. The apparatus of Fig. 2 operates in the same manner as the apparatus of Fig. 1.

If the radiation source 17 illuminates a large area as in the case of a spectrograph, a section of the phosphor strip may remain stationary in front of the source for any desired period. The motor is then switched on and the light emitted from the phosphor recorded as described above.

By subjecting the phosphor 16 to feeble radiation for an extended period of time, the phosphor surface 16 absorbs the radiation and builds it up to a point where the intensity of the subsequent emission is considerably enhanced. It is obvious that a powerful source of radiation could be degraded in the same apparatus by rotating the motor 13 at a higher rate during the radiation period and subsequently reducing the rate of rotation during the emission period of the phosphor. Thus, the apparatus may be controlled either to step up the effect of radiation or to step it down.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. A device for measuring weak radiations comprising an endless belt mounted on a pair of pulleys, means for rotating one of said pulleys at adjustable speeds of rotation, a coating on the outer surface of said endless belt of a phosphor having electron traps at a temperature of the order of 25 degrees centigrade in which emission after exposure to radiation may be induced by the application of heat to said phosphor, a radiating means impressing upon said coating at a temperature of the order of 25 degrees centigrade radiant energy whose energy level is to be measured, means for heating said phosphor to emission temperature after it has been subjected to radiation, and photoelectric means for measuring the intensity of said emission simultaneously with said heating.

2. A device for measuring weak radiations of ultraviolet or higher frequencies comprising a supporting member, a phosphor coated on the surface of said member selected from the group consisting of zinc fluoride activated with manganese, calcium sulfide, potassium chloride activated with thallium, and calcium sulfide activated with samarium and europium, means for moving said phosphor coated surface of said member at a slow uniform rate of speed while maintained at a temperature of the order of 25 degrees centigrade through the influence of a source of radiation whose level is to be measured, means for quickly heating said phosphor to emission temperatures after it has been subjected to radiation, and photoelectric means for measuring the intensity of said emission simultaneously with said heating.

3. A radiation measuring device as claimed in claim 1 wherein the phosphor surface is potassium chloride activated with thallium.

4. A device for measuring weak radiations comprising a supporting member having a surface coated with a phosphor having electron traps when subjected to radiation at a temperature of the order of 25 degrees centigrade in which emission occurs after exposure to radiation when said phosphor is heated, means for moving said phosphor coated surface of said member at a slow uniform speed through the influence of a source of radiation at a temperature of the order of 25 degrees centigrade, means for heating said phosphor to emission temperature, means for moving said coated surface of said member after it has been subjected to radiation through the influence of said heating means at a speed faster than it is moved through the influence of said radiation source, and a photomultiplier tube circuit for determining the intensity of said emission simultaneous with said heating.

5. The method of measuring low intensity radiation which comprises exposing to radiation from a low intensity source at a temperature of the order of 25 degrees centigrade a slowly moving member coated with a phosphor which stores radiation at a temperature of the order of 25 degrees centigrade and emits it at higher temperatures, quickly heating said irradiated phosphor to emission temperature, and measuring the intensity of the resulting emission simultaneous with said heating.

6. The method of measuring low intensity radiation, which method comprises slowly moving a member coated with a phosphor which stores radiation at a temperature of the order of 25 degrees centigrade and emits it at higher temperatures through the influence of a source of low intensity radiation at room temperature, moving the irradiated phosphor coated member through a heated area of a temperature sufficient to raise the irradiated phosphor to emission temperature at a speed of movement faster than it is moved through the influence of the radiation source, and measuring the intensity of the resulting emission while said member is being heated.

References Cited in the file of this patent

UNITED STATES PATENTS

| | | |
|---|---|---|
| 2,517,404 | Morton | Aug. 1, 1950 |
| 2,521,953 | Tuttle | Sept. 12, 1950 |
| 2,551,650 | Urbach | May 8, 1951 |
| 2,558,532 | Banca | June 26, 1951 |

OTHER REFERENCES

Article by H. W. Leverenz, pp. 479–493, Journal of Applied Physics, vol. 10, July 1939.